(12) United States Patent
Fain, Sr. et al.

(10) Patent No.: US 6,649,255 B1
(45) Date of Patent: Nov. 18, 2003

(54) ARTICLE AND METHOD FOR PRODUCING EXTREMELY SMALL PORE INORGANIC MEMBRANES

(76) Inventors: Douglas E. Fain, Sr., 101 Settlers Rd., Harriman, TN (US) 37748; Bruce B. Marshall, P.O. Box 791, Kingston, TN (US) 37763; Kenneth D. Adcock, 485 Solomon Hollow Rd., Harriman, TN (US) 37748; Michael R. Phillips, 308 Morgan St., Harriman, TN (US) 37748; George E. Roettger, 320 Watt Rd., Knoxville, TN (US) 37922

( * ) Notice: Subject to any disclaimer, the term of this patent is extended or adjusted under 35 U.S.C. 154(b) by 0 days.

(21) Appl. No.: 09/253,986

(22) Filed: Mar. 4, 1999

(51) Int. Cl.$^7$ .............................. B32B 3/00; B32B 3/26
(52) U.S. Cl. ................. 428/312.2; 428/312.6; 428/312.8; 428/315.5; 428/316.6; 55/523; 55/524; 210/500.25; 210/500.26; 210/510.1
(58) Field of Search .................... 428/312.2, 312.6, 428/312.8, 315.5, 316.6; 210/500.25, 500.26, 510.1; 55/523, 524

(56) References Cited

U.S. PATENT DOCUMENTS

| | | |
|---|---|---|
| 3,837,500 A | 9/1974 | Nicolas |
| 4,692,354 A | 9/1987 | Aseda |
| 4,699,892 A | 10/1987 | Suzuki |
| 5,019,263 A | 5/1991 | Haag |
| 5,100,596 A | 3/1992 | Haag |
| 5,258,339 A | 11/1993 | Ma |
| 5,342,431 A * | 8/1994 | Anderson et al. ............ 95/45 |
| 5,429,743 A | 7/1995 | Geus |
| 5,464,798 A | 11/1995 | Jia |
| 5,468,699 A | 11/1995 | Zhang |
| 5,474,681 A | 12/1995 | Fehlner |
| 5,567,664 A | 10/1996 | Barri |
| 5,591,345 A | 1/1997 | Engelen |
| 5,716,527 A | 2/1998 | Deckman |
| 5,753,121 A | 5/1998 | Geus |
| 5,770,275 A | 6/1998 | Raman |
| 5,789,024 A | 8/1998 | Levy |
| 5,824,617 A | 10/1998 | Lai |
| 6,043,177 A | 3/2000 | Falconer |
| 6,051,517 A | 4/2000 | Funke |

OTHER PUBLICATIONS

Berland, B. S., Atomic Layer Controlled Pore Reduction of Ceramic Membranes Using Sequetial Surface Reactions, North America Membrane Society, May 16–20, 1998, USA.

D. E. Fain and G.E. Roettger, High Temperature Inorganic Membrane for Separating Hydrogen, Proceedings of the Ninth Annual Conference on Fossil Energy Materials, May 16–18, 1995, Conf–9505204, ORNL/FPM–95/1, U.S. Department of Energy, 10 pages.

J.W. Bakker Wridzer, et al., Breakthrough in development of Zeolite Membranes, 18 pages, English Translation of Dutch Article.

(List continued on next page.)

Primary Examiner—Terrel Morris
Assistant Examiner—Leanna Roché
(74) Attorney, Agent, or Firm—Robert M. Poteat

(57) ABSTRACT

An article and method for producing extremely small pore inorganic membranes. The method enables reduction of the pore size of a porous inorganic membrane, such as metal oxides, metal carbides, metal nitrides and cermets. Mean pore diameters of below about 10 Å. Can readily and efficiently be achieved. After the conventional formation of an inorganic membrane, the pore size of the membrane is progressively reduced in a controlled manner to deposit one or more layers of an inorganic compound on the pore walls. This is done by exposing the membrane to the vapor of an inorganic precursor compound. The compound reacts with hydroxyl groups and or absorbed water molecules on the surface of the membrane and is thus bonded to the surface. Water vapor, oxygen, or vapors containing one or more oxygen ligands such as an alcohol are used to hydrolyze the deposited material to the inorganic membrane.

49 Claims, 2 Drawing Sheets

```
DRY INORGANIC MEMBRANE TO
REMOVE WATER, ETC. WHILE
LEAVING SURFACE HYDROXYL
GROUPS                              — 10

EXPOSE INORGANIC MEMBRANE
TO VAPOR OF PRECURSOR
INORGANIC COMPOUND                  — 12

EXPOSE MEMBRANE TO WATER
VAPOR TO HYDROLYZE
DEPOSITED MATERIAL                  — 14

REPEAT STEPS, AS NECESSARY
TO ACHIEVE DESIRED PORE SIZE        — 16
```

OTHER PUBLICATIONS

Bakker, W.J.W., "Single And Multi–Component Transport Through Metal–Supported MFI Zeolite Membranes," M.P.C. Weijen And A.A. H. Drinkenburg, Precision Process Technology, 1993, pp. 425–436.

Jia, Meng–Dong, "Ceramic–zeolite Composite . . . Vapor/Gas Mixtures" Journal of Membrane Science 90, 1984, pp. 1–10.

Tsikoyiannis, John G., "Synthesis and Characterization Of A Pure Zeolitic Membrane," Zeolites, 1992 vol. 12, Feb., pp. 128–130.

Geus, Eduard R., "High–Temperature Stainless . . . Permeation Experiments," Microporous Materials, 1, 1993, pp. 131–147.

Barrer, Richard, "Porous Crystal Membranes," J. Chem. Soc. Faraday Trans., 1990, 86 (7), pp. 1123–1130.

Niwa, Miki, "Control Of The Pore–opening Size Of Zeolite ZSM–5 By Chemical Vapor Deposition Silicon Methoxide," J. Phys. Chem 1986, 90, pp. 6233–6237.

Niwa, Miki, "Fine Control Of The Pore–opening Size Of The Zeolite Mordenite By Chemical Vapour Deposition Of Silicon Alkoxide," J. Chem. Coc. Faraday Trans., 1, 1984, 80, pp. 3135–3145.

Flanigen, E.M., "Silicalite, A New Hydrophobic Crystalline Silica Molecular Sieve," Nature, vol. 271, 9, Feb. 1978, pp. 512–516.

Funke, Hans H., "Separation of Hydrocarbon Isomer Vapors with Silicalite Zeolite," Ind. Eng. Chem.Res., 1996, pp. 1575–1582.

Baertsch, Chelsey D., "Permeation of Aromatic Hydrocarbon Vapors Through Silicalite–Zeolite Membranes," J.Phys.Chem., 1996, vol. 100, No. 18, pp. 7676–7679.

Sneh, O., "Atomic Layer Growth of $SiO_2$ On Si(100) Using $SiCl_4$ And $H_2O$ In A Binary Reaction Sequence," Surface Science 334 (1995) pp. 135–152.

Nishiyama, Norikazu, "A Defect–free Morden Membrane Synthesized By Vapor–phase Transport Method," J. Chem. Soc., Chem. Commun., 1995, pp. 1967–1968.

Yan, Yushan, "Preparation of Zeolite ZSM–5 Membranes By In–Situ Crystallization On Porous $\alpha$–$Al_2O_3$," Ind. Eng. Chem.Res., 1995, 34, pp. 1652–1661.

Sano, Tsuneji, "Improvement Of . . . Coupling Reagent," Microporous Materials, 5, 1995, pp. 179–184.

Yan, Yushan, "Zeolite ZSM–5 Membranes Grown on Porous $\alpha$–$Al_2O_3$," J. Chem. Soc., Chem. Commun., 1995, pp. 227–228.

Keisch,Peter, Zeolite–in–metal Membranes: Preparation and Testing J. Chem. Soc., Chem. Commun., 1994, pp. 2491–2494.

Werkamp, J., "Potentials of Silicalite Membranes For The Separation of Alcohol/water Mixtures, " Studies In Surface Science And Catalysis, vol. 84, 1994, pp. 1175–1182.

Xiang, Shouhe, "Formation And Characterization Of Zeolite Membranes From Sols," $3^{rd}$Int. Conf. On Inorganic Membranes, Worchester, MA, 1994, pp. 1–9.

Dillon, A. C., "Surface Chemistry Of $Al_2O_3$ Deposition Using $Al(CH_3)_3$ and $H_2O$ In A Binary Reaction Sequence," Surface Science 00, 1994, pp. 1–13.

* cited by examiner

```
┌─────────────────────────────────┐
│ DRY INORGANIC MEMBRANE TO       │
│ REMOVE WATER, ETC. WHILE        │
│ LEAVING SURFACE HYDROXYL        │
│ GROUPS                          │──— 10
└─────────────────────────────────┘

┌─────────────────────────────────┐
│ EXPOSE INORGANIC MEMBRANE       │
│ TO VAPOR OF PRECURSOR           │
│ INORGANIC COMPOUND              │──— 12
└─────────────────────────────────┘

┌─────────────────────────────────┐
│ EXPOSE MEMBRANE TO WATER        │
│ VAPOR TO HYDROLYZE              │
│ DEPOSITED MATERIAL              │──— 14
└─────────────────────────────────┘

┌─────────────────────────────────┐
│ REPEAT STEPS, AS NECESSARY      │
│ TO ACHIEVE DESIRED PORE SIZE    │──— 16
└─────────────────────────────────┘
```

Fig. 1

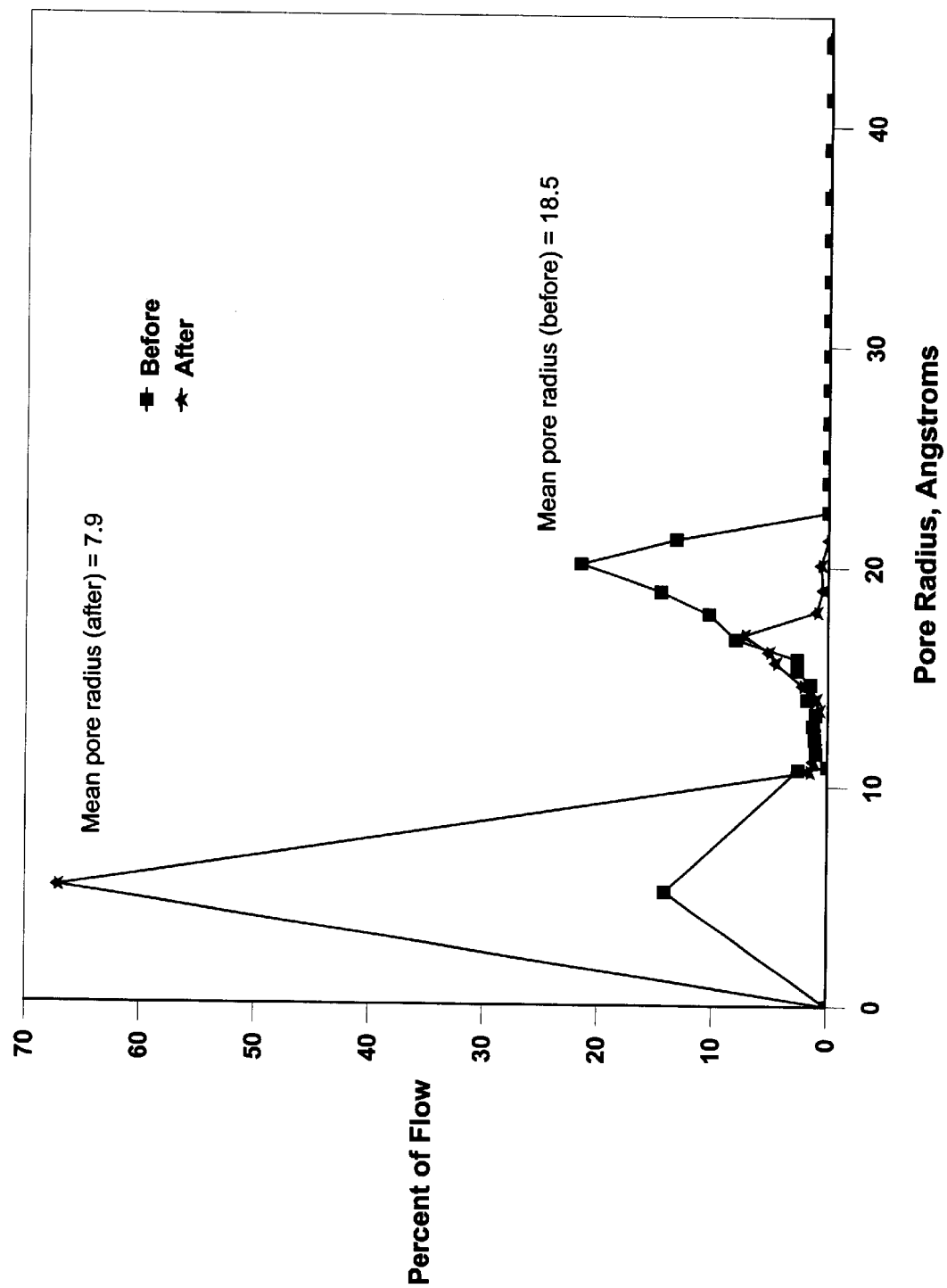

ARTICLE AND METHOD FOR PRODUCING EXTREMELY SMALL PORE INORGANIC MEMBRANES

TECHNICAL FIELD OF THE INVENTION

The present invention relates to porous inorganic membranes having extremely small pore sizes and a method for producing the fine-pored porous inorganic membranes. These porous inorganic membranes are especially useful in processes for the separation of different size molecules in gases or liquids at high temperatures and in harsh chemical environments, such as are encountered in coal gasification processes and in the petrochemical industry. The United States Government has certain rights to this invention pursuant to Contract No. DE-AC05-84OR21400 with Lockheed Martin Energy Systems, Inc. awarded by the U.S. Department of Energy.

BACKGROUND OF THE INVENTION

Development work has been carried out at a number of international locations with respect to the problem of producing porous inorganic membranes, such as ceramic membranes, having extremely small pore sizes, i.e. pores having pore diameters of a few Angstroms. Such inorganic membranes are needed for use in the separation of gases at high temperatures and in harsh chemical environments, such as are encountered in coal gasification processes and in the petrochemical industry. In particular, the membrane pores must be sufficiently small to separate gas molecules on the basis of molecular size, in a process usually referred to as molecular sieving, in order to achieve high separation factors.

Various prior art techniques have been investigated for preparing inorganic membranes, which may be either porous or nonporous in physical makeup. The latter category is typified by palladium or silver foil metals. See *Ceramic Membranes for Gas Separation*, "Synthesis and Transport Properties" Robert Jan Reinier Uhlhorn, pp 3–5, November 1963. Our invention relates to the porous category of inorganic membranes and in particular to metal oxides, metal carbides, metal nitrides, and cermets.

Membranes may be generally classified by the size of the molecules or particles being separated and generally fall into four broad categories: reverse osmosis (average mean pore diameters—1 Å–10 Å), ultrafiltration (average mean pore diameters—10 Å–1000 Å), microfiltration (1000 Å–10,000 Å), and particle filtration (>10,000 Å). More recently, research has been performed on nanofilters which include the upper molecular weight range of the reverse osmosis domain and the lower molecular weight range of the ultrafiltration domain.

The porous inorganic membranes typically are composed of a porous support or carrier with a thin separation layer. Further, the porous inorganic membranes are housed in modules having various configurations, such as hollow-fibers, spiral wound and plate-and-frame or flat-sheet configurations. See *Emergina Separation and Separative Reaction Technologies for Process Waste Reduction*, Peter P. Radechi et al, pp. 17–18, Center for Waste Reduction Technoloies American Institute of Chemical Engineers, New York, N.Y., 1999.

The prior art for making porous inorganic membranes, which has a market value of in excess of $500 million, is obviously quite extensive. However, new development in the inorganic membrane field is expected to increase the value by a factor by at least 10 fold. Of the prior art methods for preparing inorganic membranes, the one that is the most extensively used is a process commonly called the "sol-gel" process, which has been used to prepare inorganic membranes.

The sol-gel process is basically the use of a colloidal suspension of various metal oxides or other ceramic materials to make ceramic articles, which are either porous or non-porous. Typical materials are alumina, silica, titania, zirconia, or mixtures thereof. The colloidal suspension is formed by various precipitation methods. In general, the colloidal particles are very small, e.g., 1000 Å to reported as small as 30 Å. When a sufficient amount of the liquid (mostly water) is removed, the colloidal suspension (or sol) becomes a gel. To make an article, the sol-gel is formed, further dried, calcined and sintered. Depending on the degree of sintering, the article can be porous to various degrees or can approach full density.

When used to make membranes, in most cases, a porous article is desired. The size of the pores in the membrane is determined by the size and uniformity of the particles. The pores are the interstices between the particles. The effective diameter of the pores is approximately one half the diameter of the particles. If one could make a suspension with 30 Å particles (and that is really difficult), about the smallest expected pore diameters would be 15 Å or larger.

The void fraction (or fraction of the membrane that is pores) of sol-gel membranes is about 50% more or less (but not much). For a membrane with such small pores to have any practical use, it must be very thin, i.e., a few microns or preferably less. Membranes are made by applying a thin layer of the sol to the surface of a porous support material. A simple way would be to pour the sol onto the surface and then allow most of it to drain off (or by other means) to remove most of it. Initially, the sol is pulled into the surface pores of the porous support by capillary action. The sol stays near the surface and the water is pulled into the interior by capillary action. This removes a large fraction of the water from the sol and causes it to gel.

An important factor in achieving thin membranes is to have the pore diameter of the support material to be less than 100 times the expected pore diameter of the membrane. This may require a porous support with one or more intermediate layers.

It is difficult to dry and calcine the membrane layer without having a significant number of cracks (defects) in the membrane layer. The smoother the surface of the support material the fewer the cracks. This problem is frequently solved by applying several layers of the sol so that cracks that do result will be covered by one or more of the layers. See *Emerging Separation and Separative Reaction Technologies for Process Waste Reduction*, above, for additional details of the sol-gel method for producing porous inorganic membranes.

While the class of inorganic membranes commonly called "zelolites" have been prepared with pore sizes in the few Angstrom range, these membranes have a fundamental different physical structure than the typical porous inorganic membrane, such as a metal oxide. The crystallographic structure of a zeolite defines the pore diameters in contrast to a ceramic membrane wherein the pores are the interstices between the particles. Thus, while the zeolites represent an interesting approach to ceramic membranes, the basic problem to use of the zeolites as membranes in industrial applications is that the zeolite particles have to be grown into a membrane; it is difficult to grow them thin enough without defects, which without a major breakthrough limits their commercial or industrial utility.

Currently, no porous inorganic membranes having sufficiently small pores are commercially available for molecular sieving types of gas separation applications.

There is a need to provide porous inorganic membranes that have mean diameter pore sizes on the order of several Angstroms, i.e., below about 20 Å for use in separating molecules based on their size. Also, there is a need to provide an efficient method for preparing extremely small-pored inorganic membranes and in particular to provide a method that lends itself to commercial scale operations.

One objective of this invention is to provide a porous inorganic membrane having a mean pore diameter about 20 Å or less.

Another objective is to provide a process for producing extremely fine-pored inorganic membranes that are suitable for a wide range of industrial uses, including recycle of hydrogen in petroleum refinery, higher yields in olefin production and improved efficiency in a large number of chemical separation processes.

Still a further object is to provide a method for controlling the reduction of the pore diameter of porous inorganic membranes to tailor the resultant membrane for specific industrial uses for separating specific different size molecules.

SUMMARY OF THE INVENTION

In accordance with the above and other objects of the invention, it has been found that fine-pored inorganic membrane comprising a matrix of material particles having at least one monolayer of an inorganic compound uniformly deposited on the surface of the particles which make up the pore walls of the matrix can be prepared in which the mean pore diameter of the pores are less than about 20 Å. In one embodiment the porous inorganic membrane, for example, comprises an inorganic matrix of metal oxides, metal carbides, and metal nitrides with at least a monolayer of an inorganic compound, selected from the group consisting of metal oxides, metal carbides, and metal nitrides, uniformly deposited on the pore walls of the inorganic membrane.

We have found, quite unexpectedly, that a process for controlling the ultimate pore size of an fine-pored inorganic membrane could readily be achieved by depositing one monolayer at a time of an inorganic compound, such as a metal oxide, metal carbide, or metal nitride on the pore walls of the inorganic membrane. Accordingly, with each layer of the inorganic compound a effective reduction in mean pore diameter of the inorganic membrane product of a thickness of approximately one molecule of the inorganic compound, e.g., for gamma-phase $Al_2O_3$ a thickness of about 2.5 Å. In addition, as the monolayers are applied, the individual particles grow together forming a continuous matrix The process can, advantageously, be repeated one layer at a time to reduce the pore size of the matrix of the inorganic compound to achieve mean pore diameter of the pores to below about 20 Å and even below 5 Å. The resulting fine-pored inorganic membranes are especially useful for gas separations, including a range of applications involving high temperature and harsh environments, such as, for example, the separation of hydrogen from gasified coal at process temperature.

Also, these fine-pored inorganic membranes are useful in large-scale industrial applications in, for example, the petroleum industry and include the separation of hydrogen from high-temperature catalytic dehydrogenation processes used for a broad range of petrochemicals, such as olefin production, as well as the removal of hydrogen from the refinery purge gases. These inorganic membranes with their extremely small pore size and uniformly deposited inorganic compound on the walls of the pores of the matrix, which have heretofore not been attained by the prior art, are uniquely useful as membranes, including molecular sieves.

In accordance with the invention, a method is provided for producing porous inorganic membranes having the extremely small pore sizes discussed above, i.e., pore sizes capable of providing separation of gas molecules by molecular sieving.

According to the invention, a method is provided for reducing the pore size of a porous inorganic membrane having a surface including therein pores with pore walls, wherein the method comprises depositing at least one layer of inorganic compound on the pore walls of the pores of the inorganic membrane, with each layer of inorganic compound deposited on the inorganic membrane having a thickness of approximately one molecule. Preferably, the depositing of the at least one layer comprises depositing a sufficient number of layers to reduce the mean pore diameter of the pores to 20 Å or less.

In one embodiment of the present invention the pore size of the matrix of an inorganic compound is reduced by vapor treating the inorganic compound with a reactive vapor of a inorganic precursor compound which (1) includes a reactive group that reacts with surface hydroxyls or other surface molecules on the inorganic membrane and which (2) also reacts with water or other chemical vapor that can combine with the precursor to produce a surface that the precursor will react with. This reactive vapor produces a reaction with the surface hydroxyls on the inorganic membrane surface to bond precursor molecules to the inorganic membrane. Preferably, the inorganic membrane surface is thereafter treated with water vapor, oxygen, or vapors containing one or more oxygen ligands such as an alcohol to convert the inorganic precursor compound into the corresponding inorganic compound.

The membrane is preferably treated with an inorganic precursor compound selected from the group consisting of chloro-silanes, organo-silicon compounds, chloro-titaniums, organo-titanium compounds, organo-aluminum compounds, and chloro-zirconia, and organo-zirconia compounds. Further, the inorganic membrane is preferably made of a inorganic compound selected from the group of alumina, titantia, zirconia, silica and alumina/silica mixtures.

Advantageously, the method further comprises drying the inorganic membrane prior to treating the membrane with the reactive vapor of the inorganic precursor compound. This drying preferably comprises heating the membrane and holding the membrane at temperature of 100° C. to 200° C. for one to two hours in an evacuated vessel. In this implementation, the treating of the inorganic membrane with the reactive vapor of the inorganic precursor compound preferably comprises introducing the reactive vapor into the evacuated vessel, evacuating the vessel to remove unreacted inorganic precursor compound products and then introducing the water vapor, oxygen, or vapors containing one or more oxygen ligands such as an alcohol into the vessel. Advantageously, the method further comprises evacuating and refilling the vessel alternately with the reactive vapor and water vapor a plurality of times.

In one preferred implementation, the inorganic membrane is comprised of alumina and the vapor treating with a reactive vapor comprises treating with a trimethyl aluminum vapor. In an alternative implementation wherein the inorganic membrane is comprised of alumina, the treating with a reactive vapor comprises treating the inorganic membrane with an anhydrous aluminum chloride vapor while in another implementation, the treating with a reactive vapor comprises treating the inorganic membrane with a titanium tetrachloride vapor.

In an advantageous embodiment, the at least one layer is deposited only on one side of the inorganic membrane. Preferably, prior to depositing the at least one layer, the inorganic membrane is seated in a holder, which enables deposition on only the one side.

Other features and advantages of the invention will be set forth in, or apparent from, the following detailed description of preferred embodiments of the invention.

BRIEF DESCRIPTION OF THE DRAWINGS

FIG. 1 is a block diagram or flow diagram of the basic steps of a method in accordance with a preferred embodiment of the invention; and FIG. 2 is a graphical representation of the pore size distribution and percentage of flow as a function of pore radius, in Angstroms, for a sample inorganic membrane before and after the pore size reduction treatment provided by the method of the invention.

DESCRIPTION OF THE PREFERRED EMBODIMENTS

As described above, the method of the invention, in general, provides for reducing the pore size of porous inorganic membrane in a controlled manner by depositing at least one layer of an inorganic compound on the walls of the pores of the porous inorganic membrane, with each layer having a thickness of approximately one molecule of the inorganic compound, i.e., being of one monolayer thickness or less. While the invention is applicable to a number of different types of porous inorganic membranes, including titania, zirconia, silica and alumina/silica mixtures, (among others), the discussion below will focus on porous alumina membranes.

As a first step, a porous alumina membrane is preferably given a mild-drying treatment to remove any water that is condensed by capillary action in the membrane pores and to remove most of the absorbed water and other contaminants from the membrane surface while leaving hydroxyl groups on the surface. This step is represented or indicated by block 10 in FIG. 1. Such drying may be accomplished by heating the membrane and holding it at 100° C. to 200° C. for one to two hours in a vessel that is evacuated to a moderate vacuum. Such a vacuum is readily achievable with a mechanical vacuum pump. This drying treatment can be expected to leave essentially a monolayer of hydroxyl groups on the surface of the alumina.

Following the drying treatment, a water-reactive aluminum compound, such as trimeythl aluminum (TMA) is introduced into the evacuated vessel as a vapor. This step is generally indicated by block 12 in FIG. 1. The mass of TMA can be readily controlled by several known techniques to assure delivery of adequate TMA while avoiding significant excesses. For example, an evacuated transfer vessel of known volume can be filled to the desired pressure with TMA vapor from a supply cylinder, and this known volume can be introduced into the evacuated treatment vessel containing the membrane or membranes. A second method would be to expose the alumina membrane to a small constant pressure of TMA. In any event, whatever technique is used, the TMA molecules react with hydroxyls and or absorbed water molecules on the surface of the alumina membrane and thereby become chemically bonded to the alumina surface. This reaction with hydroxyls and or absorbed water molecules is expressed by the following equation:

$$Al(CH_3)_3 + OH \rightarrow AlO(CH_3)_2 + CH_4 \qquad (1).$$

The treatment vessel may be evacuated and refilled with TMA vapor one or more times aid in removal of the reaction product, methane ($CH_4$), from the small membrane pores and to aid transfer of trimethyl aluminum vapor into the pores. This treatment will produce a monolayer of $AlO(CH_3)_2$ on the surface of the pore walls.

After TMA treatment, the vessel is evacuated to remove all unreacted TMA and then water vapor, oxygen, or vapors containing one or more oxygen ligands such as an alcohol is introduced therein. This step is indicated by block 14 in FIG. 1. The water molecules react with the methyl groups, liberating the methane and leaving hydroxyl groups attached to the deposited aluminum. This is expressed by the equation:

$$AlO(CH_3)_2 + 2H_2O \rightarrow AlO(OH)_2 + 2CH_4 \qquad (2).$$

This reaction leaves the surface covered with a monolayer of the $AlO(OH)_2$.

The vessel may be evacuated and refilled with water vapor more than once to aid in transferring water vapor into the small pores and removing the methane.

The foregoing method deposits a layer of alumina with exposed monolayers of hydroxyls, approximately one molecule thick on the walls of the membrane pores, thereby reducing the pore radius by that thickness. For example, if the deposited layer were 3 Å thick, the pore radius would be reduced by 3 Å and the pore diameter by 6 Å. Of course, the pore diameter may be reduced further by depositing one or more additional layers of alumina by treating the membrane alternatively with TMA vapor and water vapor as described above. Such a step is indicated by block 16 in FIG. 1. It is noted that application of a partial monolayer of alumina can be accomplished by increasing the drying temperature prior to the TMA vapor exposure, thus reducing the concentration of surface hydroxyls.

After completing vapor treatments, the membrane may be heat treated in air to stabilize the membrane for subsequent use at high temperatures.

It is important to the practice of our invention to note that the starting inorganic membrane can have any mean pore diameter and the pore diameter can be successively reduced by approximately one molecule thickness on the pore walls of the membrane.

The method of the invention can be used, and has been used, with other chemicals. For example, alumina membranes have been treated with anhydrous aluminum chloride vapor followed by treatment with water vapor and this resulted in the successful deposition of alumina on the membranes and in reduced pore size. Because the vapor pressure of anhydrous aluminum chloride (a solid) is relatively low, the compound was heated to 124° C. to provide a high vapor pressure and the treatment vessel containing the membranes was held at a slightly higher temperature in order to limit the relative pressure and avoid condensation of the vapor on the system surfaces.

The method of the invention has also been applied to treat alumina membranes with titanium tetrachloride vapor and water vapor. The vapor pressure of titanium tetrachloride (a liquid at room temperature) was sufficiently high to permit vapor treatments to be performed at room temperature. This treatment successfully deposited titania on the membranes and reduced the pore size.

Based on these results, the method of the invention can be used to deposit any compound that can be on the membrane walls and chemically reacted to prepare the compound to accept additional layers. Thus, in addition the methods using TMA, anhydrous aluminum chloride, and titanium tetrachloride described above, a broader class of ceramic precursor compounds can be used which would include compounds (a) which have adequate vapor pressure to be used in a vapor treatment, (b) which have a reactive group that will react with surface hydroxyls and or absorbed water molecules and bond the precursor molecules to the ceramic surface, and (c) which will react with water vapor, oxygen, or vapors containing one or more oxygen ligands such as an alcohol (with or without the application of heat) to convert to the desired ceramic. Other examples of this class of ceramic precursor compounds include chloro-silanes, some organo-silicon compounds, and several organo-aluminum compounds, in addition to TMA. As stated above, while the focus in the specific examples set forth above was on alumina membranes the method is applicable to most types of ceramic membranes including.e.g., titantia, zirconia, silica and alumina-silica mixtures.

In an advantageous implementation the membrane is sealed in a holder so that the membrane is exposed to the treatment vapors only from one side of the membrane. This reduces the pore size at one membrane surface, thereby resulting in a significantly thinner portion of the membrane having the reduced size pores. This approach should produce a small pore size membrane having a much higher permeance.

The method of the invention can be used as an efficient means to alter the surface chemistry as well as the physical attributes of the particles that makeup any inorganic membrane. One example of this would be the depositing of silica on the surface of an alumina membrane. In addition, certain other organometallic compounds commonly used for chemical vapor deposition in the semiconductor industry, such as the di-or tri- methyl or -ethyl compounds of the group IB–VIB elements, could be used for this purpose.

Further, the method could be used to bond together inorganic compound particles that make up a membrane in order to increase the durability of the membrane. For example, the present method could be used to strengthen larger pore membranes, e.g., ~1000 Å, by depositing one or more monolayers on the larger particles that makeup the matrix material, thereby physically joining the particles and imparting strength to the matrix material.

EXAMPLE 1

A porous alumina ($Al_2O_3$) membrane was prepared in accordance with the method of this invention as follows: a gamma alumina membrane in the form of a 0.4" OD tube commercially available from U.S. Filter Corporation was used. The membrane used was the smallest pore size membrane available from U.S. Filter and was apparently produced by a: sol-gel process. The mean pore radius was 18.5 Å as measured by the Dynamic Pore (DPS) Test. The membrane was placed in an evacuated vessel and given a mild drying treatment by vacuum drying (~1 torr) at 100° for one hour. This step was to ensure that water which is capillary condensed in the pores of the alumina is removed, as well as the removal of any adsorbed water and any other contaminants from the pores of the membrane while leaving hydroxyl groups on the surface of the $Al_2O_3$ particles that make up the membrane matrix.

The dried membrane was next exposed to trimethyl aluminum (TMA) vapor at room temperature to react the TMA molecules with the hydroxyls and any remaining water molecules absorbed on the surface of the $Al_2O_3$ particles. The TMA relative pressure was maintained at less than 30% for a period of 30 minutes.

After the TMA treatment, the vessel was evacuated to remove all unreacted TMA and then the alumina membrane was exposed to water vapor at room temperature. The water vapor reacted with the remaining methyl groups, liberating methane and leaving hydroxyl groups attached to the deposited aluminum molecule.

The alumina membrane was further treated by alternating reaction with the TMA and water vapor. After three cycles of such treatment, the membrane was heated to 300° C. in air for one hour and retest, using the DPS test. The mean pore radius of the alumina membrane had been reduced to 8 Å. The pore size distributions measured on the membrane before and after treatment are shown in FIG. 2.

In an effort to reduce the pore size further, the alumina membrane was further treated by drying, exposure to TMA vapor, exposure to water vapor, and heated at 300° C. After this additional treatment, the DPS Test was unable to measure the pore size of the membrane, indicating that the pore radius had been reduced to approximately 5 Å or smaller.

The alumina membrane was subsequently tested in a high temperature flow test system at several temperatures between room temperature and 275° C. using helium (He) and carbon tetrafluoride ($CF_4$) as test gases. Separation factors for He/$CF_4$ were determined from the ratios of the pure gas flows measured at each of several temperatures. The He/$CF_4$ separation factor determined for the membrane at 250° C. was 4.98. A mathematical model used to estimate the membrane pore size indicated that mean pore radius of the test membrane was 5.0 Å.

After testing, the alumina membrane was subjected to a further cycle of vapor treatment/water vapor in an effort to reduce the pore size yet further and to thereby increase the separation factor. After this was done, the alumina membrane was again tested in the high temperature flow test system at several temperatures. The He/$CF_4$ separation factor determined for the membrane at 250° C. was 62.4. This value, which was the mean of three determinations, is dramatically higher than the separation factor of 4.98 determined previously prior to the last treatment cycle. Using the mathematical model referred to above, the mean pore size of the alumina membrane was determined to be 2.5 Å. It will thus be appreciated that the method of the invention is effective in reducing pore size and, in particular, is capable of producing extremely small pores, having a mean pore radius of 2.5 Å or smaller, such as is required in achieving high separation factors by molecular sieving.

The alumina membrane appeared to be stable and exhibited reproducable permeability values for the duration of testing which was over several weeks.

EXAMPLE 2

An alumina membrane was prepared using the same method and apparatus described in Example 1, except that titanium tetrachloride vapor was used in place of the trimethyl aluminum. The vapor pressure of titanium tetrachloride (a liquid at room temperature) was sufficiently high to permit the vapor treatments to be performed at room temperature.

The successful deposition of titania on the walls of an aluminia membrane demonstrates the flexibility of the method of the invention and importantly the use of the method to alter the chemical surface of the membrane, i.e., any incoming gas would see titania instead of the alumina matrix. This is important in being able to tailor the chemical nature of the membrane surface.

EXAMPLE 3

Three titania membranes were prepared using the sample method and apparatus described in Example 2. These membranes were dried by evacuating to about 1 torr at 100° C. for 2 hours to remove excess absorbed or capillary condensed water. A titania tetrachloride vapor retort and the dample holders were evacuated. Titania tetrachloride vapor was allowed into the vapor retort to about 0.9 relative pressure. This vapor was allowed to expand into the sample retort, yielding a titania tetrachloride vapor relative pressure of 0.7. After 30 minutes, the titania tetrachloride vapor was pumped out and air with 5% relative humidity was added and held for 30 minutes.

This treatment was repeated except the titania tetrachloride relative pressure was 0.5. The membranes were heated at 300° C. in air for 2 hours. The two titania tetrachloride treatments produced a decrease in permeability which would indicate a reduction in pore size of about 3 Å. An increase in weight if distributed evenly over the pore surfaces would be consistent with about 2 monolayers of titania. The initial pore diameter of these membranes was 100 Å.

EXAMPLE 4

A typical porous inorganic membrane can be fabricated by applying one or more porous layers onto a porous support tube, then applying one or more monolayers of an alumina by alternately applying, for example, trimethyl alumina vapor and 10% relative humidity air two or three times, then heat treating at 300° C. or higher in air for a period of 1 hour to produce a stable alumina. The vapor treatments can be repeated until the desired final pore size is obtained.

Although the invention has been described relative to exemplary embodiments thereof, it will be understood by those skilled in the art that variations and modifications can be effected in these exemplary embodiments without departing from the scope and spirit of the invention.

What is claimed is:

1. A porous inorganic membrane comprising a matrix of material particles having at least one monolayer of an inorganic compound uniformly deposited on the surface of the particles which make up the pore walls of said matrix and said matrix having a mean pore diameter of below about 20 Å.

2. The inorganic membrane of claim 1 wherein said matrix is a cermet.

3. The inorganic membrane of claim 1 wherein said matrix is selected from the group consisting of a metal oxide, metal carbide, metal nitride, and a cermet.

4. The inorganic membrane of claim 3 wherein said matrix is gamma phase $Al_2O_3$.

5. The inorganic membrane of claim 3 wherein said matrix is titania.

6. The inorganic membrane of claim 3 wherein said matrix is zirconia.

7. The inorganic membrane of claim 3 wherein said matrix is silica.

8. The inorganic membrane of claim 3 wherein said matrix is mixtures of alumina, titania, zirconia, and silica.

9. The inorganic membrane of claim 1 wherein said inorganic compound is selected from the group consisting of metal oxide, metal nitride, and metal carbide.

10. The inorganic compound of claim 9 wherein said metal oxide is gamma phase $Al_2O_3$.

11. The inorganic compound of claim 9 wherein said metal oxide is titania.

12. The inorganic compound of claim 9 wherein said metal oxide is zirconia.

13. The inorganic compound of claim 9 wherein said metal oxide is silica.

14. The inorganic compound of claim 9 wherein said metal oxide is a mixture of alumina, titania, zirconia, and silica.

15. A porous inorganic membrane comprising a matrix of material particles having at least one monolayer of an inorganic compound uniformly deposited on the surface of the particles which make up the pore walls of said matrix and said matrix having a mean pore diameter of below about 5 Å.

16. The inorganic membrane of claim 15 wherein said matrix is a cermet.

17. The inorganic membrane of claim 15 wherein said matrix is selected from the group consisting of a metal oxide, metal carbide, metal nitride, and a cermet.

18. The inorganic membrane of claim 17 wherein said matrix is gamma phase $Al_2O_3$.

19. The inorganic membrane of claim 17 wherein said matrix is titania.

20. The inorganic membrane of claim 17 wherein said matrix is zirconia.

21. The inorganic membrane of claim 17 wherein said matrix is silica.

22. The inorganic membrane of claim 17 wherein said matrix is mixtures of alumina, titania, zirconia, and silica.

23. The inorganic membrane of claim 15 wherein said inorganic compound is selected from the group consisting of metal oxide, metal nitride, and metal carbide.

24. The inorganic compound of claim 23 wherein said metal oxide is gamma phase $Al_2O_3$.

25. The inorganic compound of claim 23 wherein said metal oxide is titania.

26. The inorganic compound of claim 23 wherein said metal oxide is zirconia.

27. The inorganic compound of claim 23 wherein said metal oxide is silica.

28. The inorganic compound of claim 23 wherein said metal oxide is a mixture of alumina, titania, zirconia, and silica.

29. An inorganic membrane comprising a substrate, and at least one additional porous layer comprised of a matrix of material particles having at least one monolayer of an inorganic compound uniformly deposited on the surface of the particles which make up the pore walls of said matrix and said matrix having a mean pore diameter of below about 20 Å, said additional porous layer being bonded to said substrate.

30. The inorganic membrane of claim 29 wherein said additional porous layer is selected from the group consisting of metal oxide, metal nitride, metal carbide, and a cermet.

31. The inorganic membrane of claim 30 wherein said metal oxide is gamma phase $Al_2O_3$.

32. The inorganic membrane of claim 30 wherein said metal oxide is titania.

33. The inorganic membrane of claim 30 wherein said metal oxide is zirconia.

34. The inorganic membrane of claim 30 wherein said metal oxide is silica.

35. The inorganic membrane of claim 30 wherein said metal oxide is a mixture of alumina, titania, zirconia, and silica.

36. The inorganic membrane of claim 29 further comprising a substrate, an intermediate porous layer comprised of a metal oxide ceramic, and at least one additional porous layer comprised of a matrix of material particles having at least one monolayer of an inorganic compound uniformly deposited on the surface of the particles which make up the pore walls of said matrix and said matrix having a mean pore diameter of below about 20 Å, said intermediate porous layer being bonded to said substrate and said additional porous layer being bonded to said intermediate layer.

37. The inorganic membrane of claim 36 wherein said additional porous layer is selected from the group consisting of metal oxide, metal nitride, metal carbide, and a cermet.

38. The inorganic membrane of claim 37 wherein said metal oxide is gamma phase $Al_2O_3$.

39. The inorganic membrane of claim 37 wherein said metal oxide is titania.

40. The inorganic membrane of claim 37 wherein said metal oxide is zirconia.

41. The inorganic membrane of claim 37 wherein said metal oxide is silica.

42. The inorganic membrane of claim 37 wherein said metal oxide is a mixture of alumina, titania, zirconia, and silica.

43. The inorganic membrane of claim 29 further comprising a substrate, an intermediate porous layer comprised of a metal oxide ceramic, and at least one additional porous layer comprised of a matrix of material particles having at least one monolayer of an inorganic compound uniformly deposited on the surface of the particles which make up the pore walls of said matrix and said matrix having a mean pore diameter of below about 5 Å, said intermediate porous layer being bonded to said substrate and said additional porous layer being bonded to said intermediate layer.

44. The inorganic membrane of claim 43 wherein said additional porous layer is selected from the group consisting of metal oxide, metal nitride, metal carbide, and a cermet.

45. The inorganic membrane of claim 43 wherein said metal oxide is gamma phase $Al_2O_3$.

46. The inorganic membrane of claim 43 wherein said metal oxide is titania.

47. The inorganic membrane of claim 43 wherein said metal oxide is zirconia.

48. The inorganic membrane of claim 43 wherein said metal oxide is silica.

49. The inorganic membrane of claim 43 wherein said metal oxide is a mixture of alumina, titania, zirconia, and silica.

* * * * *